Sept. 30, 1969  R. D. HULL  3,469,799
SPINNING REEL BRAKE
Filed June 15, 1966  4 Sheets-Sheet 1
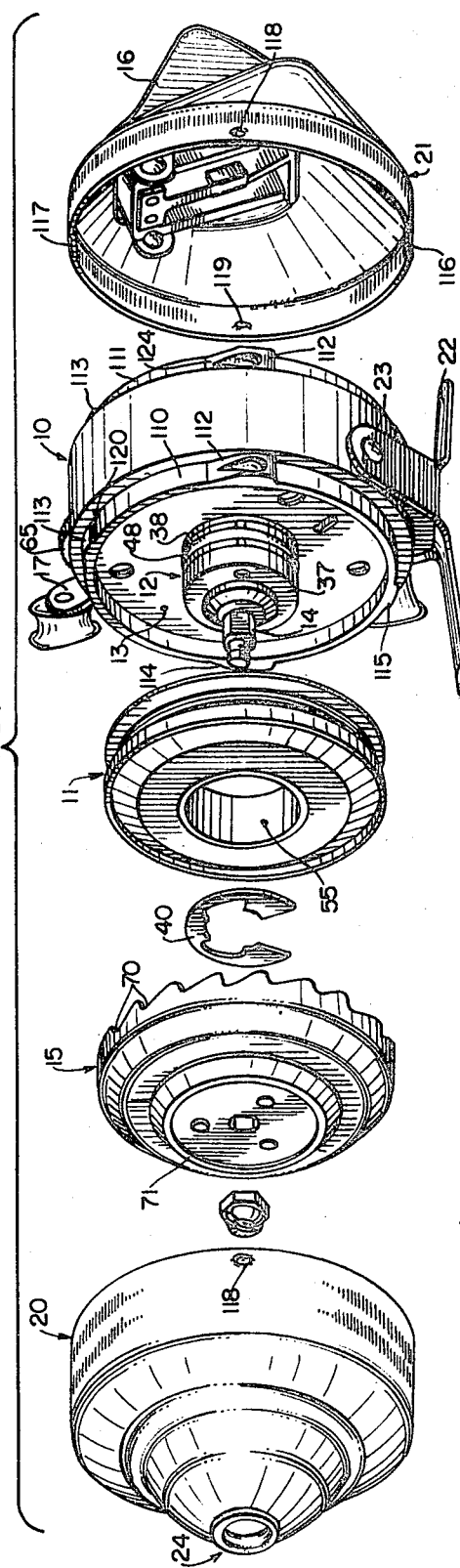
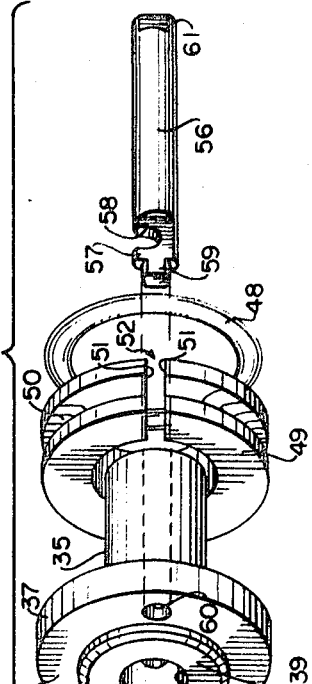
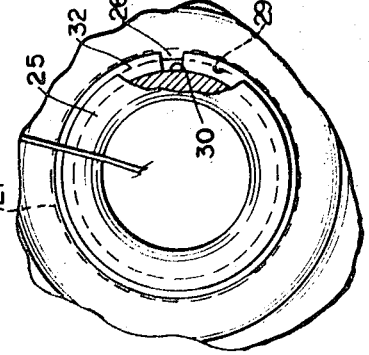
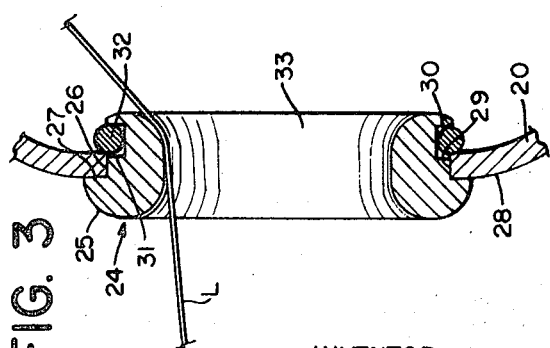
INVENTOR
R. DELL HULL
BY *Mandeville & Schweitzer*
ATTORNEYS

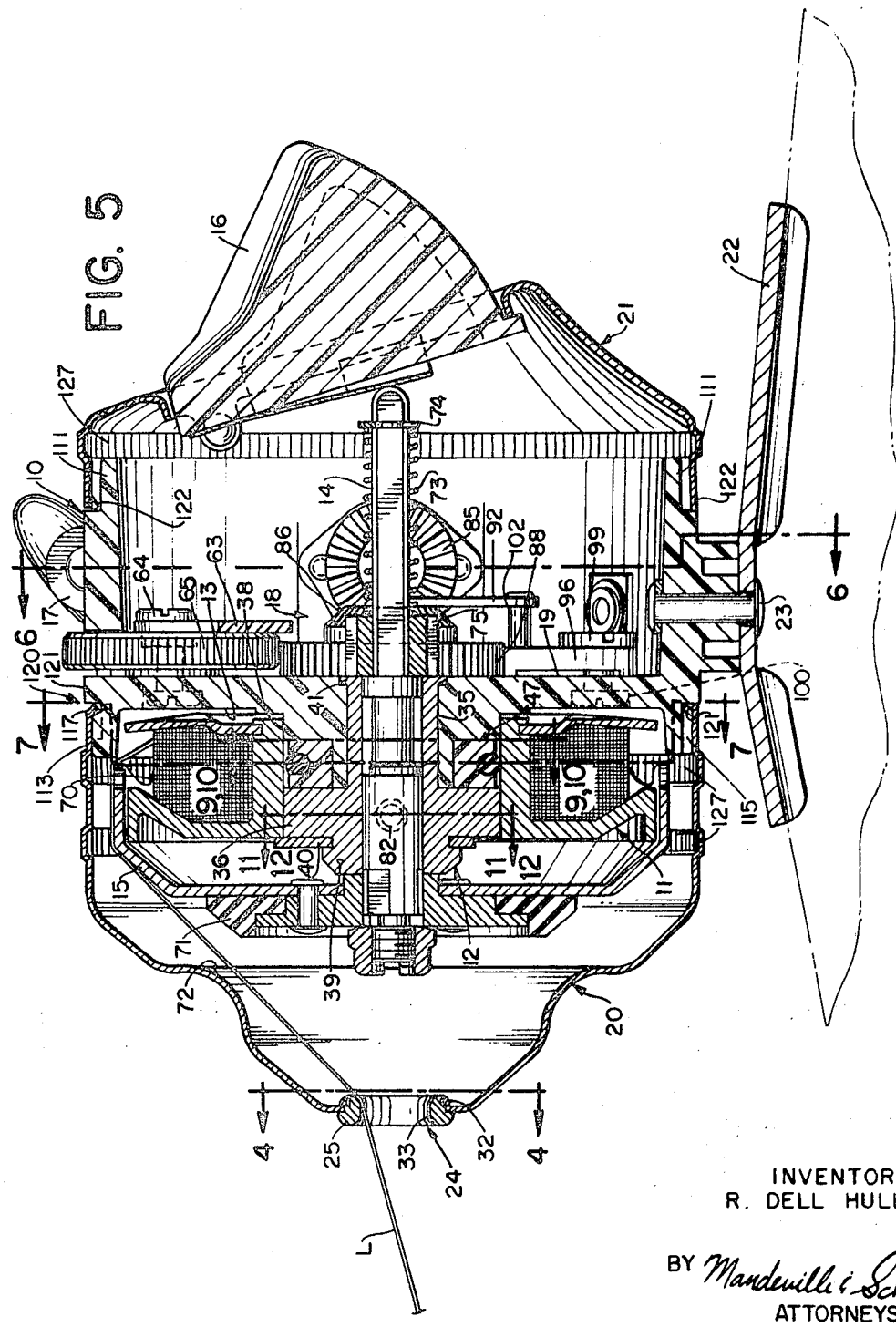

Sept. 30, 1969   R. D. HULL   3,469,799
SPINNING REEL BRAKE
Filed June 15, 1966   4 Sheets-Sheet 3

INVENTOR
R DELL HULL
BY *Mandeville & Schwartz*
ATTORNEYS

Sept. 30, 1969  R. D. HULL  3,469,799
SPINNING REEL BRAKE
Filed June 15, 1966  4 Sheets-Sheet 4

INVENTOR
R. DELL HULL

BY Mandeville & Schweitzer
ATTORNEYS

United States Patent Office 3,469,799
Patented Sept. 30, 1969

3,469,799
SPINNING REEL BRAKE
R. Dell Hull, 6101 E. Apache St.,
Tulsa, Okla. 74115
Filed June 15, 1966, Ser. No. 557,752
Int. Cl. A01k 89/00
U.S. Cl. 242—84.2                                            8 Claims

ABSTRACT OF THE DISCLOSURE

The present invention is directed to spinning reel control mechanisms including an adjustable drag brake which utilizes a controllably expandable O-ring disposed between an improved hub construction and a normally non-rotatable spool seated thereon. The specific shape of the O-ring is varied, and thus the degree of brake force application is controlled, through a cam actuated O-ring retainer. The hub construction includes a radially disposed, spring loaded pin which cooperates with portions of the main shaft of the reel to lock the same forwardly of the reel during casting and to unlock the shaft, allowing it to move rearwardly of the reel, at the commencement of line retrieval.

---

The present invention relates to fishing reels and, more particularly, to improvements in spinning reels of the so-called "closed face" type.

In this type of spinning reel, a line spool is normally non-rotatably mounted on a hub which projects forwardly from a reel frame and is enclosed by a cup shaped cover. While the line spool is normally non-rotatable, provision is made for limited rotary slippage or "drag" of the spool relative to the reel frame for controlled withdrawal of line from the spool. The line itself is conducted to and from the spool through a centrally disposed line guide in the cover.

Retrieval of paid out fishing line may be effected in reels of this type by a spinner head mounted on a rotatable main shaft. Advantageously, the spinner head may include a plurality of rearwardly opening pickup slots formed thereon and may be selectively axially displaced and held in a forward, non-line engaging position during casting and in a rearward, line engaging position during line retrieval. A crank assembly is included in the reel to effect the necessary rotation of the main shaft and to retrieve paid out line. Furthermore, reels of this type generally include a selectively actuable anti-reverse mechanism to prohibit rotation of the retrieval mechanism in a "reverse" line pay out direction.

One aspect of the invention is the provision of a new and improved adjustable drag mechanism which includes a clutch O-ring disposed in contact with the bore of the line spool and supported by a resilient clutch ring retainer mounted within the hub which supports the line spool. In accordance with the invention, a cam actuator disposed between opposite faces of a split formed in the clutch ring retainer may be rotated to increase and decrease, respectively, the effective outer diameter of the retainer and the O-ring carried thereon, increasing and decreasing the frictional drag force applied to the spool.

A further aspect of the invention is the provision of a new and improved spool mounting hub which includes the aforementioned drag brake clutch ring retainer and the actuating control mechanism therefor. Another specific aspect of the invention is the inclusion in the hub construction of a main shaft locking mechanism adapted to lock the main shaft and the spinner head carried thereby in a forward position during line pay out and to unlock the shaft upon the commencement of crank rotation. More specifically, the locking mechanism includes a radially disposed locking pin and cooperating locking shoulder and cam portions formed on the main shaft.

Another aspect of the present invention is the provision of an improved, selectively actuable anti-reverse mechanism which includes a locking pawl which is rotated out of engagement with a driving gear when it is rotated in a line retrieval direction and which is urged into gear locking relation when the driving gear tends to be rotated in the reverse direction.

Another aspect of the invention, a new and improved cover assembly, is provided for independently and securely locking front and rear covers to a spinning reel frame with a simple "apply and twist" manipulation. To that end and in accordance with the principles of the invention, forwardly and rearwardly extending cylindrical flange portions of the reel frame are provided with a diametrically opposed pair of ratchet-like portions having locking recesses formed therein and a pair of diametrically opposed locking grooves located intermediately of the locking recesses. Each of the covers has radially inwardly projecting detents and radially inwardly projecting keys formed thereon and spaced to cooperate with the locking recesses and locking grooves. The covers may be attached to the reel frame by telescoping the detents and keys with the flange portions of the reel frame and thereafter rotating the detents and keys into locking engagement with the recesses and grooves. The assembly of covers to reel frame is made very easy, yet the attachment is both stable and reliable.

Another aspect of the invention is the provision of a new and improved line guide in the front cover. The new line guide includes a hardened annular member which has rearwardly facing portions removed therefrom to form a shoulder having an outer diameter equal to the diameter of an opening in the front of the cover. The shoulder itself has an annular groove formed thereon towards its rear surface, which groove is adapted to receive a springlike locking ring, the outer diameter of which is greater than the diameter of the opening in the front cover. Thus, in accordance with the invention, the line guide may be simply and expeditiously assembled with the front cover by first inserting the shoulder portions through the cover opening with the shoulder bearing against the outer surface of the cover and thereafter inserting the locking ring in the annular groove, causing the line guide to be securely clamped to the cover between the shoulder and the locking ring.

For a more complete understanding of the invention and its attendant advantages, reference should be made to the following detailed description taken in conjunction with the accompanying drawings, in which:

FIG. 1 is an exploded perspective view of a new and improved fishing reel embodying the inventive concepts;

FIG. 2 is an enlarged, exploded perspective view of the elements of the new drag brake mechanism of the invention;

FIG. 3 is an enlarged cross-sectional view of the new line guide of the invention;

FIG. 4 is a rear view of the new line guide taken along line 4—4 of FIG. 5;

FIG. 5 is a cross-sectional view of the new fishing reel taken along line 5—5 of FIG. 6;

Figure 6:
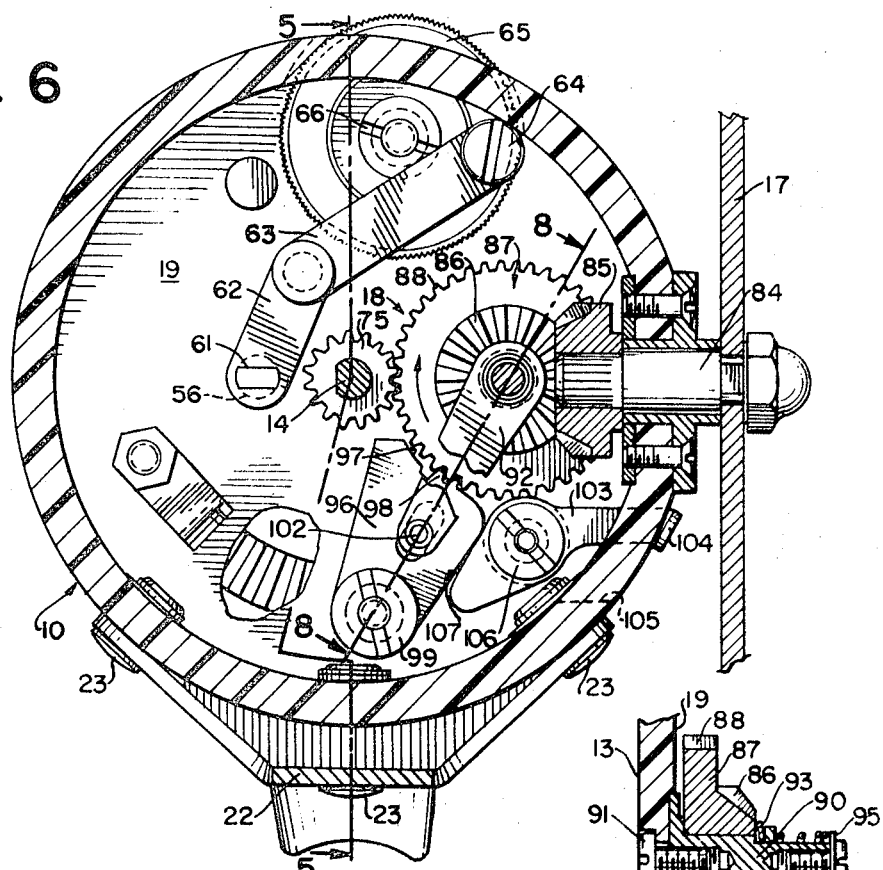
Figure 7:
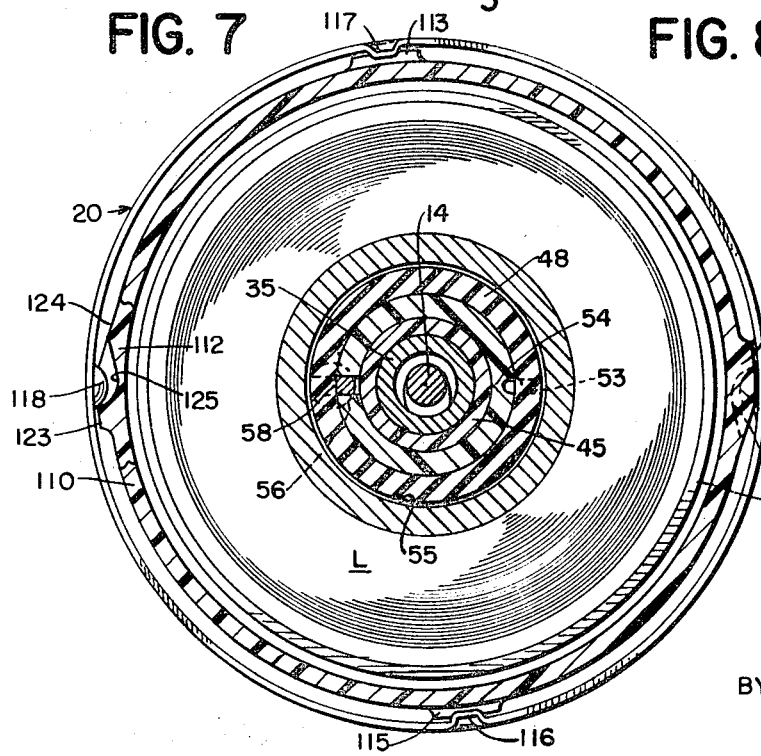
Figure 8:
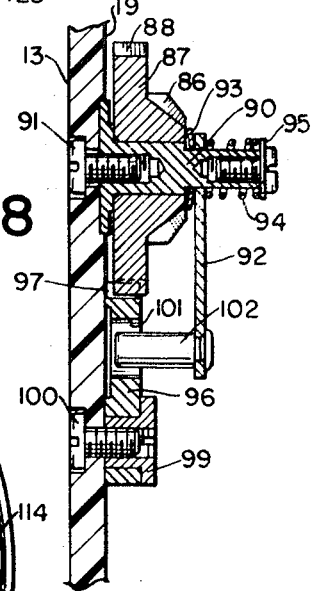
Figure 12:
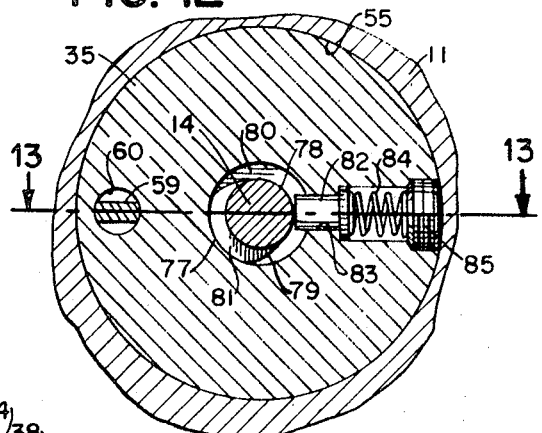
Figure 13:
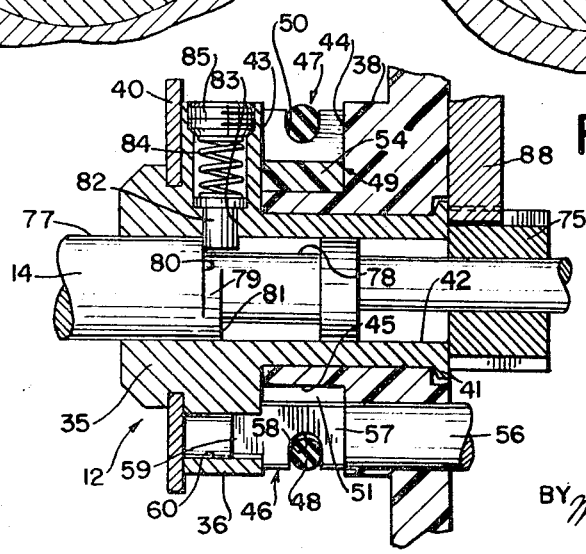

FIGS. 6 and 7 are cross-sectional views of the reel taken along line 6—6 and 7—7 of FIG. 5;

FIG. 8 is an enlarged, fragmentary, cross-sectional view of the improved anti-reverse mechanism of the new reel taken along line 8—8 of FIG. 6;

FIGS. 9, 10, 11, and 12 are enlarged, fragmentary cross-sectional views of the reel taken along lines 9—9, 10—10, 11—11, and 12—12, respectively, of FIG. 5; and FIG. 13 is an enlarged, fragmentary, cross-sectional view of the new reel mechanism taken along line 13—13 of FIG. 12.

Referring to FIGS. 1 and 5, the new and improved fishing reel includes a generally cylindrical reel frame body 10 which mounts a line spool 11 on a hub 12 projecting from its front wall 13. A main shaft 14 is supported in the reel frame body for rotation and limited axial displacement. As shown best in FIG. 1, a notched spinner head 15 is mounted at the forward end of the main shaft, while a thumb button 16 engages its rearward end. The reel also includes a crank 17 which drives the main shaft 14 through a gear train 18 disposed at the rear wall 19 of the reel frame body and shown best in FIG. 6. The reel frame body and the elements supported thereby are generally enclosed by front and rear covers 20 and 21, respectively. As shown, a rod mount 22 is affixed to the reel frame body through rivets 23.

The above described elements are, in general, common to many spinning reels of this general type. However, it should be understood that the present invention is directed to specific improvements in the structure, function, and interrelationship of parts of such reels. As will be apparent from the following description, the reel of the present invention includes the various features of novelty heretofore mentioned, all of which contribute to the improved performance and efficient operation of reels of this general type, and facilitate their manufacture.

Referring now to FIGS. 1, 3, and 4, a new line guide 24 is provided at the forwardmost end of the front cover 20. The line guide 24 is fabricated in the form of an annular ring 25, advantageously made of a specially hardened stainless steel, while the cover 20 typically is formed of a soft, formable material. The ring is undercut at its rearwardly facing portions to define a stepped surface having a cylindrical cover engaging portion 26 and a rearwardly facing shoulder portion 27, which are adapted to be received in a front opening 29 of the front cover 20 and to seat against the front surface 28 of the cover. An annular groove 30 is formed beneath the surface 26 and, as shown in FIG. 3, includes a forward wall 31 which is spaced from the shoulder 27 by a distance which is less than the thickness of the front cover 20.

In accordance with the invention, the line guide may easily be inserted and hold in the front cover by snapping into the groove 30 a flexible, line guide retainer ring 32, which is in the form of a split wire spring, as shown in FIG. 4. The ring 32 has an inner diameter approximately equal to that of the inner diameter of the groove 30 (which is less than the diameter of the opening in the front cover 20) and has an outer diameter greater than the opening in the front cover 20. Thus the line guide may be assembled with the front cover in an extremely expedient manner by inserting the rearward facing stepped surface through the opening in the cover and thereafter snapping the retaining ring 32 into place in the groove 30.

As shown in FIG. 3, the line guide will be clampingly engaged with and secured to the front cover by the opposing shoulder 27 and the surfaces of the retaining ring 32. Tightness of the assembly is achieved by the wedging action of the retaining ring between the rearwardly facing surface of the front cover and the forwardly facing surface of the annular groove 30. Abrasion free passage of the line L through the line guide is facilitated by generous rounding of its hardened inner surfaces 33. The new line guide assembly enables a specially hardened front line guide to be installed economically and efficiently in the front cover, and also accommodates replacement of a worn guide.

A line spool 11 is normally non-rotatably mounted on the hub assembly 12. In accordance with the invention, the hub 12 includes a center bearing 35 having a flange 36 (FIG. 2) with spool support surfaces 37. As shown best in FIG. 2, the surfaces 37 are cylindrical and of the same diameter as the surfaces of cylindrical hub portions 38 integral with and projecting forwardly from the front wall of the reel frame body. The center bearing 35 also includes a locking nose portion 39 over which an E-clip 40 may be placed to retain the spool 11 on the hub surfaces 37, 38 and against the forward wall 13 of the reel frame body in a normally non-rotatable manner. As shown in FIG. 13, rearward extremities 41 of the center bearing are staked to the reel frame body. An axial bore 42 extends through the bearing 35 for the purposes of supporting the main shaft 14 for rotation and axial displacement therein.

Figure 9:
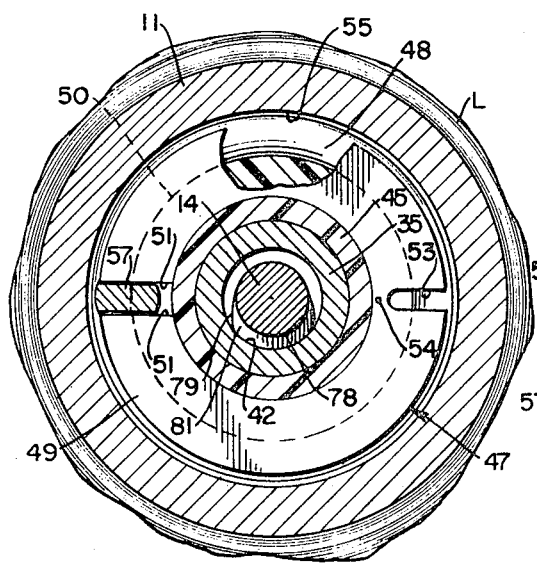
Figure 10:
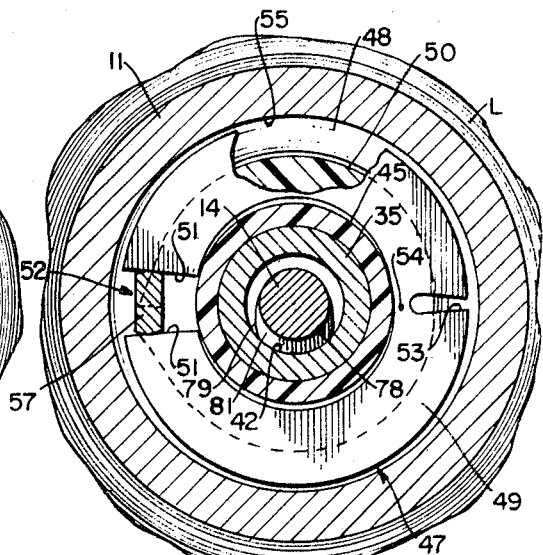
Figure 11:
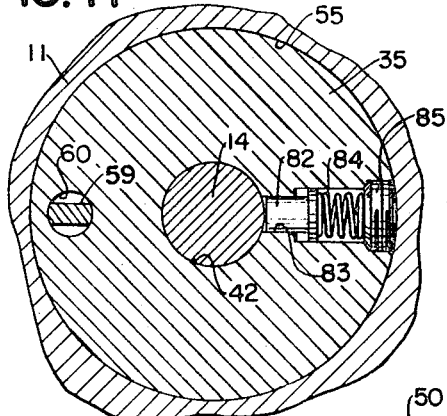

As shown best in FIG. 13, the rearwardly facing surfaces 43 of the flange 36 and the forwardly facing surfaces 44 of the integral cylindrical hub portion 38 form, along with the outer cylindrical surface 45 of an integral projection extending from the hub portion 38, an annular groove 46 in the hub in which a new and improved expandable drag brake 47 is disposed. More specifically, the drag brake includes an O-ring clutch element 48 advantageously of a stretchable material having a relatively high coefficient of friction, such as rubber, supported in a special clutch ring retainer 49 which, as shown in FIGS. 9 and 10, comprises what is perhaps best characterized as a "closed C-shaped" member having a support groove 50 formed in its peripheral portions. More specifically, the clutch ring retainer 49 includes opposed, spaced free edge portions 51 which are definitive of an actuating slot 52 which extends radially through the retaining ring and provides the ring with its so-called "closed C" appearance.

In accordance with the invention, the clutch ring retainer is weakened for flexion by the formation of a slot 53 in areas diametrically opposed to the actuating slot 52. As shown in FIGS. 9 and 10, the slot 53 extends radially inwardly from the periphery of the retaining ring beyond the depth of the groove 50 but terminates short of the inner diameter of the retaining ring. Thus the slot 53 divides the retaining ring into two halves connected by a narrow throat portion 54, which throat portion provides a region about which each of the halves may be freely pivoted.

As will be appreciated, the clutch element 48 is adapted to bear against the bore surfaces 55 of the line spool 11 with varying degrees of pressure to accommodate limited rotation of the spool 11 about the hub 12. The drag brake, of course, prevents line breakage when excessive force is exerted thereon such as by a hooked fish. In accordance with the invention, the amount of force required to rotate the spool against the holding force of the clutch element (i.e., the drag) may be adjustably controlled by expanding the clutch element 48 into varying degrees of contact with the spool surfaces 55 through the increase of the diameter of the clutch ring retainer element 49.

Expansion of the O-ring clutch element 48 is effected through a clutch shaft 56 which is supported axially of the housing and in the hub portions 38 and in the center bearing 35. More specifically, the clutch shaft includes an eccentric actuating portion 57 having a U-shaped opening 58 therein to accommodate passage of the clutch ring 48 therethrough. As shown, the eccentric element is formed simply by milling parallel flats on opposite sides of the shaft 56 to provide the actuator portions 57 with relatively high and low (eccentric) portions with respect to the central axis of the shaft about which it is rotated. The forwardmost end 59 of the shaft 56 is reduced in size and is adapted to be rotatably supported in the opening 60 formed in the center bearing 35. The rearwardmost end of the shaft 56 has flats 61 formed thereon which are engageable, as shown in FIG. 6, with a clutch actuating linkage comprising articulated links 62 and 63 which are in turn pivotably connected by a screw 64 to a rotatable thumb wheel 65 rotatably mounted on the rear wall 19 of the reel frame body by a screw 66.

As will be appreciated, rotating forces applied to the thumb wheel 65 will be transmitted through the linkages 62, 63 to the shaft to rotate the same selectively and to expand the diameter of the clutch retaining ring. More specifically, as shown in FIGS. 9 and 10, when the low or flat portions of the actuating portions 57 are disposed parallel and in engagement with the retaining ring surfaces 51, the retaining ring halves will assume a non-pivoted position and the diameters of the groove 50 and the clutch element 48 supported therein will assume their minimum dimensions. Of course, in this position, the drag force exerted on the line spool is correspondingly at its minimum. However, in accordance with the invention, rotation of the crank shaft will cause the eccentric actuator 57 to gradually spread the surfaces 51 apart, causing the retaining ring halves to be pivoted about the throat 54 in a manner in which the outer diameter of clutch element 48 is progressively increased thereby progressively increasing the drag force exerted on the spool surfaces 55. A maximum drag force is obtained when the high portions of the eccentric 57 are engaged with the surfaces 51, as shown in FIG. 10. More specifically, with an eccentric actuator of the illustrated configuration, the maximum and minimum drag positions will be reached within 90° of rotation of the shaft 56.

The main shaft 14 carries the spinner head 15 which, as shown in FIGS. 1 and 5, includes rearwardly facing line engaging notches 70 and a forwardly facing line brake element 71. As is customary in reels of this type, the main shaft 14 is mounted for axial displacement in order that the brake 71 may be urged into a forwardmost position against the front cover portions 72 to pinch and brake the line L therebetween during the initial phases of the casting operation and in order that the spinner head may be held in an intermediate, non-braking position in which the notches 70 are disposed forwardly of the line spool during line pay out in the final phases of the casting operation. The shaft 14 is also adapted to be moved axially into a rearwardmost position in which the notches 70 overlie the mouth of the spool during line retrieval operations. As is common in reels of this general construction, the main shaft is normally urged rearwardly of the reel frame by a coil spring 73 acting between a clip 74 mounted on the rear end of the shaft and a pinion 75 non-rotatably keyed to the shaft. As shown in FIG. 5, the pinion bears against the rearward extremities 41 formed of the bearing 35.

In accordance with the present invention, a new and improved main shaft locking mechanism for retaining the shaft 14 in its intermediate position during casting and before line retrieval has been included in the hub 12. The locking mechanism comprises a stop pin 82 disposed in a radial passage 83 opening into the bore 42 formed in the center bearing 35 and a coil spring 84 disposed and retained in the stepped passage 83. As will be appreciated, the spring 84 acts between the head of the pin 82 and a set screw 85 to normally urge the pin 82 into the bore 42. As shown in FIG. 13, a forward portion of the shaft 14 has a cylindrical surface 77 approximately equal to the bore dimension of the center bearing 35, while intermediate undercut portions 78 of the shaft 14 have a substantially reduced diameter. In accordance with the inventive principles, the smaller diameter portions are merged with the larger diameter portions by an intermediate cam surface 79 which, as shown in FIG. 12 has surface portions which merge with both the surfaces 78 and the surfaces 77. As shown in FIG. 13, shoulders 80 and 81 are formed on the shaft 14 between the surfaces 77, 78 by the forwardly facing undercut portions of the shaft.

When the shaft 14 is thrust into its forwardmost position by depression of the thumb button 16 during casting, the main shaft portion 77 will be disposed forwardly of the stop pin 82 thus permitting the pin 82 to be projected into the bore 42 (FIG. 12). Upon release of the thumb button, the shaft will be urged rearwardly under the influence of the main shaft spring 73. However, its rearward displacement will be limited by engagement of one of the shoulders 80, 81 with the pin 82. In this intermediate position of the shaft 14, the spinner head 15 will be held with its notches disposed forwardly of the mouth of the line spool in a non-interfering relation with the pay out of line during the cast. However, upon subsequent rotation of the shaft 14, the stop pin 82 will be urged by the cam 79 into a retracted position (FIG. 11) clear of the shoulders 80, 81 freeing the shaft for further rearward displacement under the urging of spring 73 into its rearwardmost position in which the pickup notches 70 of the pickup head are disposed over the mouth of the spool 11 (FIG. 5).

Thus, it should be appreciated that the construction of the hub 12 provides for the inclusion therein of the clutch retainer elements of the new drag brake assembly as well as the new shaft control mechanism.

In order to retrieve paid out line (e.g., when landing a fish), the main shaft 14 is rotated through the pinion 75 which is keyed thereto. As shown in the drawings, rotary motion of the pinion is derived from rotation of the external crank 17 which in turn rotates a crank shaft 84 and a beveled gear 85 affixed on the inner end thereof, which beveled gear 85 cooperates with the bevel portion 86 of a combination gear 87. The spur gear portion 88 of the combination gear 87 meshes with the pinion 75 and completes the gear train connecting the crank handle 17 to the main shaft 14.

As shown best in FIG. 8, the gear 87 is mounted for rotation on a stepped stud 90 secured to the frame by a screw 91. Specifically, the rearward surfaces of the stud support an anti-reverse actuator 92 which is disposed in effective frictional or slip driving communication with the rearward surfaces of the gear 87 through an interposed friction disk 93. The requisite force for the frictional or slip drive between the actuator 92 and the gear 87 is provided by a coil spring 94 disposed between a flanged screw 95 at the end of the stud 90 and the actuator.

In accordance with the invention, an anti-reverse element 96, having involute portions 97 and blocking portions 98, is mounted for rotation beneath the gear 87 on a nut 99 secured to the frame rear wall 19 by a screw 100. The anti-reverse element 96 is rotated by a pin 102 projecting forwardly from the free end of the anti-reverse actuator 92 into a slot 101 formed in the anti-reverse element.

As will be understood, rotation of the gear 87 in the indicated clockwise direction (retrieval direction) will drive the blocking portion 98 of the anti-reverse element out of engagement with its teeth 88 through the above-described pin and frictional drive. Continued rotation of the gear 87 is accommodated by slipping of the gear 87 with respect to the actuator 92. However, reversal or counterclockwise rotation of the gear 87 will immediately cause the blocking portion 98 of the anti-reverse element to engage the spur gear teeth 88 and to prohibit further counterclockwise or "reverse" rotation. Advantageously, the involute portion 97 includes a plurality of teeth for meshing with the gear 87, and the blocking portion 98 is of sufficient arcuate extent to bear against a plurality of gear teeth. This arrangement minimizes wear of the teeth of the gear 87 resulting from the anti-reverse action.

In some instances it is desirable to make the anti-reverse element inoperative, i.e., to turn it "off," and to that end the new reel includes an anti-reverse control element 103. As shown in FIG. 6, the anti-reverse control includes a lever 104 which projects outwardly of the frame through an opening 105 and which is pivotable about a mount 106, which supports the control element at the rear wall of the reel frame adjacent the anti-reverse element 96.

The anti-reverse control includes a cam surface 107 which in its "off" position positively displaces the anti-reverse element 96 and holds the blocking portions 98 thereof out of stopping engagement with the gear teeth 88 regardless of the direction of rotation of the gear 87. The surface 107 is pivotable into an "on" position (FIG. 6) in which the anti-reverse element is operative in stopping rotation of the gear 87 in the reverse direction. In accordance with one aspect of the invention, in the "off" position the lever 104 will abut the lower wall of the slot 105 and when in the "on" position, the lever will abut the upper wall of the slot 105.

As shown best in FIG. 1, the reel frame 10 includes forwardly and rearwardly projecting cylindrical flanges 110, 111, respectively, which are of a diameter slightly less than the diameter of the cylindrical flange portions of the front and rear covers 20, 21, to provide for a substantial clearance between the covers and flange portions. In accordance with one aspect of the invention, four cover supporting and locking projections 112–115 are formed at approximate 90° intervals on each of the flanges 110, 111, which projections are adapted to cooperate with radially inwardly extending appurtenances formed at corresponding 90° intervals on the covers 20, 21. More specifically, these appurtenances are in the nature of stabilizing keys 116, 117 formed at the peripheral edges of each of the covers and detent buttons 118, 119 formed adjacent the edges, as shown in FIGS. 1 and 7. More specifically, the projections 113, 115 are axially spaced from the front and rear shoulders 121, 122 formed between the cylindrical flanges 110, 111 and the reel frame body 10 to define keyways or grooves 120 therebetween (FIG. 5). The projections 112, 114, as shown in FIGS. 1 and 7, advantageously have ratchet-like profiles which are defined by inclined planes 124 which rise gradually from the flanges to outermost cover supporting portions 123 (FIG. 7) having a diameter slightly less than that of the cover members. The cover supporting portions 123 drop away abruptly to the flanges 110, 111. Within each of the projections 112, 114 a tear-drop shaped recess 25 is formed.

In accordance with the invention, the covers may be assembled to the reel frame by telescoping the detent buttons with the flanges 110, 111 aligned adjacent to the sloped portions of the projections 112, 114 and thereafter rotating the covers to snap the buttons into locking engagement with the recesses 125 and to engage the keylike elements 116, 117 in the keyways 120. The covers may be lockingly engaged with the projections 112, 114 from the sloped portions only, since the detent buttons are effectively prevented from entering the recesses over the abrupt drop off portions of the ratchet-like projections 112, 114. The detents 118, 119 fit closely into the recesses and require some torque to be applied for positive locking to be achieved.

The new cover lock arrangement simplifies assembly of the covers to the reel frame by an easy push-and-turn action, because the initial rotary alignment of the cover to the frame is not critical. At the same time, a highly stable cover lock arrangement is afforded by a four-point locking support of the cover, only two of the four points being detent locks, however, to facilitate easy manual locking and unlocking by turning of the cover. By providing a clearance space between the covers 20, 21 and the flanges 110, 111 sufficient to accommodate the inward projection of the stabilizing keys and detent buttons, the covers may be applied axially to the reel frame in any rotary orientation over a range of about 80 degrees.

The new and improved reel may be operated simply and effortlessly. When the line L (with a lure attached thereto) is prepared for casting, a fisherman need only depress the thumb button 16 to advance the spinner head 15 and to clamp the line between the cover portion 72 and the brake ring 71 during the backswing and initial frontswing of the cast.

Release of the thumb button 16 during the casting motion will permit the spinner head to be retracted under the influence of the spring 73 and will allow the line to be drawn freely off the spool by the momentum of the cast lure. In accordance with the invention, during casting the spinner head is maintained in an intermediate position by engagement of the pin 82 with a shoulder 80 or 81. In this position, the notches 70 are forward of the mouth of the normally non-rotatable spool 11.

Retrieval of the paid out line is effected by rotation of the main shaft through the crank 17 and the interposed gear train. In accordance with the invention, rotation of the shaft unlocks the pin 82 by displacing it from the bore of the center bearing through the action of the cam 79. Once unlocked, the shaft 14 will assume its rearwardmost position under the influence of the spring 73 in which position the spinner head notches 70 are disposed over the mouth of the spool 11. Continued rotation of the shaft will cause the line to be engaged by one of the notches 70 and to be found about the spool 11.

During retrieval, excessive forces may be exerted on the line by a hooked fish, a snagged object, or the like. As should be understood, the clutch O-ring 48 accommodates limited slippage of the spool 11 about the hub 12, and concomitant line pay out, to prevent the excessive load from snapping the line as would otherwise be the case. As an important aspect of the invention, the "drag" of the reel is easily adjusted through the rotatable thumb wheel 65 to increase or to decrease the diameter of the O-ring 48 and hence the resistance to slippage of the spool 11. Furthermore, it should be appreciated that the use of the relatively soft O-ring in the clutch mechanism compensates for limited out-of-round conditions of the spool, and therefore accommodates wider manufacturing tolerances without compromising the operation of the reel.

When it is desired to prohibit reverse rotation of the retrieval mechanism, positioning of the control lever 104 in the "on" position against the upper portions of the slot 105 will allow the anti-reverse element 96 to be driven through the actuator element 92 into blocking engagement with the gear 88. Of course, if the anti-reverse operation of the reel is not desired, the anti-reverse element 96 may be prevented from engaging the gear 88, i.e., it may be turned "off," by pivoting the lever 104 to its lower position. In the lower position, the cam surface 107 holds the element 96 away from the gear 88, as should be understood.

It should be understood that the specific structure herein illustrated and described is intended to be representative only, as certain changes may be made therein without departing from the clear teachings of the disclosure. Accordingly, reference should be made to the following appended claims in determining the full scope of the invention.

What is claimed is:

1. In a spinning reel including a reel frame, a normally non-rotatable line spool having a cylindrical bore of predetermined diameter mounted on a cylindrical support projecting forwardly from said frame, and a spinner element mounted on a longitudinal main shaft supported in said frame for rotation about a predetermined axis, an improved drag brake mechanism comprising:
   (a) a continuous elastic annular clutch O-ring having an outer diameter approximately equal to that of said cylindrical bore and adapted to be fully circumferentially engageable with said bore;
   (b) a generally annular clutch retaining ring formed of a material having a high fatigue strength element;
   (c) said retaining ring having a radially extending gap therein to give said ring a generally closed C-shape;

(d) a clutch ring expander element rotatable about an actuator axis passing through said gap and having eccentric actuating surfaces; and (e) means for rotating said expander element to expand the clutch O-ring and to engage it fully with said cylindrical bore of said spool.

2. The reel of claim 1, in which
(a) said eccentric surfaces are formed on the end of a rotatable clutch shaft;
(b) said clutch shaft is supported in said reel frame body and projects axially into said cylindrical support; and
(c) the means for rotating said clutch shaft are included in said reel frame.

3. The reel of claim 2, in which
(a) a U-shaped opening is formed on the end of said clutch shaft; and
(b) said O-ring passes through said opening.

4. The reel of claim 1, in which
(a) said means for rotating said clutch shaft includes an articulated linkage;
(b) one end of said linkage being connected to said clutch shaft, the other end of said linkage being pivotally connected to a rotatable thumb wheel;
(c) said thumb wheel being mounted on said reel frame body and having peripheral portions projecting outwardly thereof.

5. A reel in accordance with claim 1, in which
(a) said cylindrical support for said line spool includes an integral hub projecting forwardly from said reel frame body and having an outer diameter approximately equal to the inner diameter of said line spool;
(b) said hub having a step formed on the forward end thereof definitive of a vertical wall and a clutch retainer ring support surface;
(c) said hub including a central, axially extending bore;
(d) a center bearing member supported in said bore and including an annular flange proximately of its forward end;
(e) the outer surfaces of said flange having an outer diameter substantially equal to said hub and in effect forming an extension thereof;
(f) the inner wall of said flange being parallel to said vertical wall of said hub and cooperating therewith to define an annular groove for said clutch retainer ring.

6. The reel of claim 5, in which
(a) said center bearing includes an axially extending bore in which said main shaft is mounted;
(b) a stepped passage, having enlarged diameter portions and smaller diameter portions, radially extends entirely through said flange and into said bore in said center bearing element;

(c) a detent pin having an enlarged head is disposed in said passage with the head in the enlarged diameter portions thereof and with the pin in the smaller diameter portions thereof;
(d) a detent spring means disposed in the larger diameter portions of said passage urges said pin into a projected position within said bore.

7. The reel of claim 6, in which
(a) said main shaft includes forward portions having a diameter approximately equal to that of said bore and adjacent rearward portions having a smaller diameter and being separated from said forward portions by shoulder means;
(b) said shoulder means including an eccentric cam means providing a continuous surface communicating between said portions;
(c) said cam means including high and low surface portions which merge with said forward and rearward shaft portions, respectively;
(d) spring means urging said main shaft rearwardly of said reel frame body;
(e) whereby said shaft is adapted to be locked in a forward position by engagement of said projected detent pin with said shoulder means and said shaft is adapted to be returned under the influence of said spring means to a rearward position upon being rotated to cam said detent into a non-projected position.

8. The reel of claim 1, in which
(a) said retaining ring is provided with a throat portion diametrically opposed to the split therein;
(b) said throat portion dividing said retaining ring into semi-circular elements which are effectively hinged at said throat portion to accommodate expanding and contracting movements of said retaining ring.

References Cited

UNITED STATES PATENTS

| 2,548,317 | 4/1951 | MacBlane | 242—84.45 |
| 2,557,230 | 6/1951 | McLeod | 242—84.45 |
| 3,023,978 | 3/1962 | Denison et al. | |
| 3,044,730 | 7/1962 | Yeada. | |
| 3,088,691 | 5/1963 | Hull. | |
| 3,152,771 | 10/1964 | Maury et al. | |
| 3,198,456 | 8/1965 | Wood. | |
| 3,255,980 | 6/1966 | Veno. | |

BILLY S. TAYLOR, Primary Examiner

U.S. Cl. X.R.

242—84.5.